United States Patent [19]
Christian

[11] Patent Number: 4,944,378
[45] Date of Patent: Jul. 31, 1990

[54] SYNCHRONIZING RING

[75] Inventor: Klaus Christian, Immenstaad, Fed. Rep. of Germany

[73] Assignee: Zahnradfabrik Friedrichshafen AG, Friedrichshafen, Fed. Rep. of Germany

[21] Appl. No.: 274,056
[22] PCT Filed: Apr. 11, 1987
[86] PCT No.: PCT/EP87/00200
 § 371 Date: Sep. 29, 1988
 § 102(e) Date: Sep. 29, 1988
[87] PCT Pub. No.: WO87/06314
 PCT Pub. Date: Oct. 22, 1987

[30] Foreign Application Priority Data
 Apr. 16, 1986 [LU] Luxembourg ...... PCT/EP86/00222

[51] Int. Cl.⁵ .............................................. F16D 23/04
[52] U.S. Cl. .............................. 192/107 M; 192/53 R; 192/53 F; 192/107 R
[58] Field of Search ............ 192/107 R, 107 M, 53 E, 192/53 F, 53 R, 53 G

[56] References Cited
U.S. PATENT DOCUMENTS 4,267,912 5/1981 Bauer .......................... 192/107 M X
4,597,484 7/1986 Takiguchi .................. 192/107 M X

FOREIGN PATENT DOCUMENTS 0159080 10/1985 European Pat. Off. ....... 192/107 M
0162393 11/1985 European Pat. Off. .
2055345 5/1972 Fed. Rep. of Germany .
3122522 12/1982 Fed. Rep. of Germany .
2744994 8/1985 Fed. Rep. of Germany .
3412779 11/1985 Fed. Rep. of Germany .
3532672 3/1986 Fed. Rep. of Germany .
1535343 8/1968 France .
2538482 6/1984 France .
0308309 6/1933 Italy ................................ 192/107 R
0314425 1/1934 Italy ................................ 192/107 R
1137332 12/1968 United Kingdom .

Primary Examiner—Rodney H. Bonck
Attorney, Agent, or Firm—Herbert Dubno

[57] ABSTRACT

Synchronizing ring for a synchronizing assembly in a clutch coupling of a motor vehicle with an interrupted and coated friction surface conically arranged with respect to the transmission axis, whereby the synchronizing ring having two mutually parallel conical surfaces which are interrupted in the circumferential direction through profiling by hollow stamping of the entire synchronizing ring and that one or both friction surfaces have a friction coating.

3 Claims, 1 Drawing Sheet

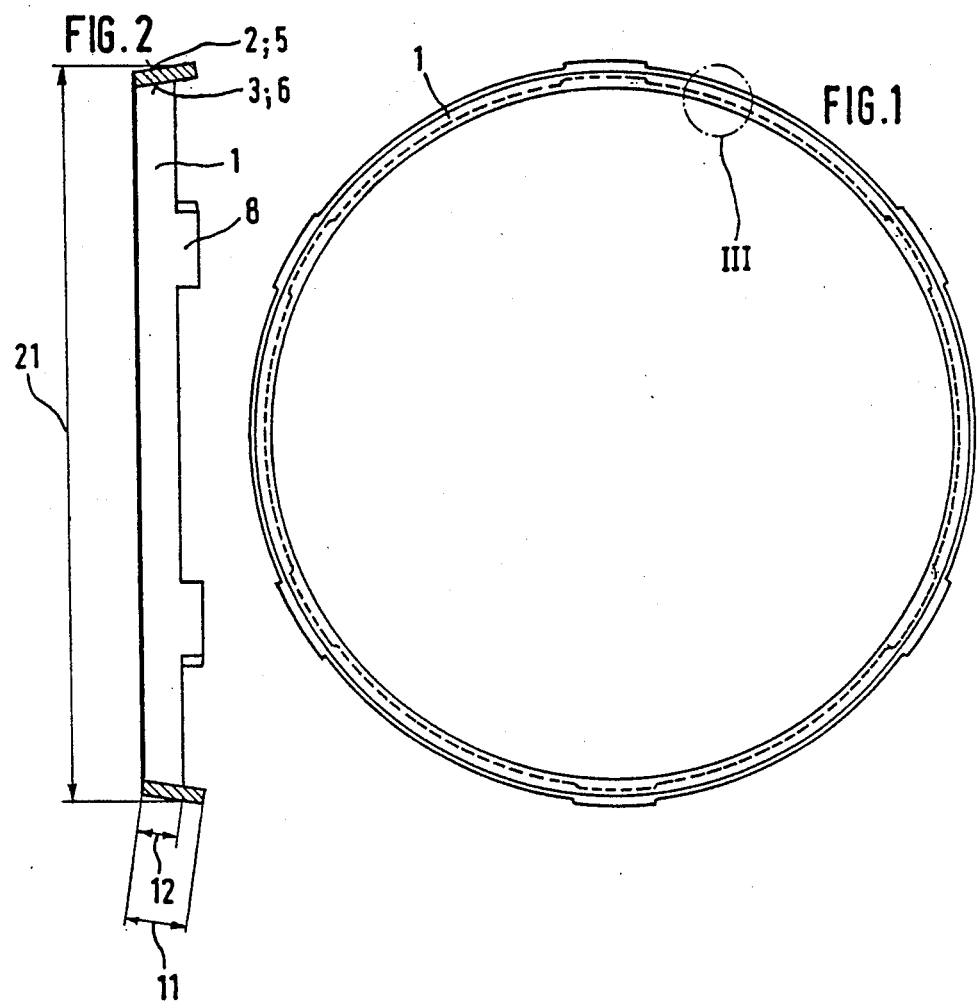
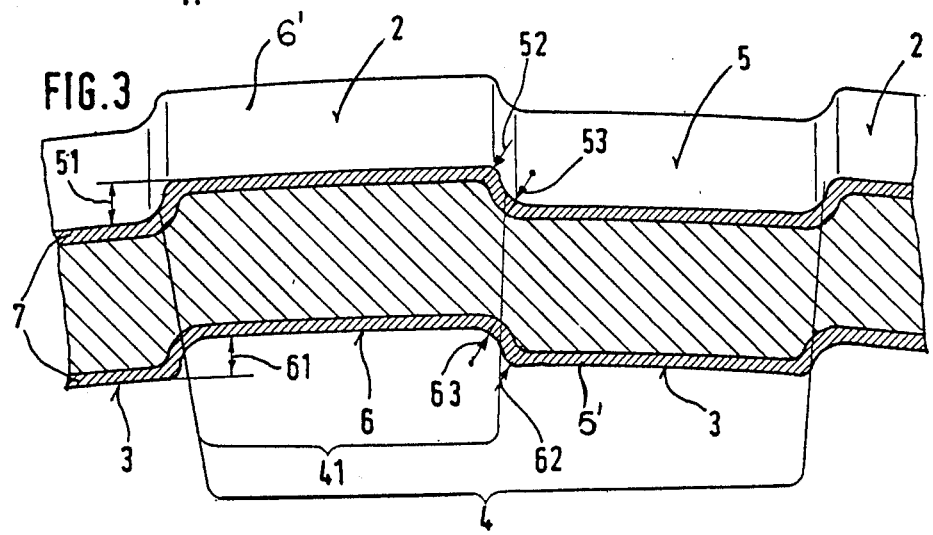

SYNCHRONIZING RING

CROSS REFERENCE TO RELATED APPLICATION

This application is a national phase application of PCT/EP 8700200 filed 11 Apr. 1987 and based, in turn, upon a Luxembourg application PCT/EP86/00222 filed 16 Apr. 1986 under the International Convention.

1. Field of the Invention

The invention relates to a synchronizing ring.

More particularly, the invention relates to a synchronizing ring for a synchronizing assembly in the drive train of an automotive vehicle.

2. Background of the Invention

Synchronizing rings of this type are known and are made of various metallic materials, for instance through casting, sintering, and so on (German open specification 20 55 345 and German Patent 31 22 522). The friction surfaces are produced through spraying, dense-sintering, cementing (such as in German Patent 27 44 994) or also by coating the friction surface of a synchro ring and the welding thereof (see EP 01 62 393 A1). As shown in these mentioned references, it is also already known to provide the friction surface with grooves or recesses for the evacuation of the lubrication oil.

Such synchronizing rings have proven themselves in practice in the most various combinations in the manufacturing of the ring itself. The coating with a friction surface and the affixing of drainage grooves depending upon the requirements and the construction of the synchronizing assembly. However, a high technological effort, and as a result, high costs are common to all these synchronizing rings, when high demands are made.

OBJECT OF THE INVENTION

It is the object of this invention to provide an improved synchronizing ring in a synchronizing assembly as described which is of lower production cost and requires less fabrication efforts.

SUMMARY OF THE INVENTION

This object is attained, in accordance with the invention, in a synchronizing ring have two mutually parallel conical surfaces which have a friction coating and are interrupted in a circumferential direction by a profile consisting of alternating lands and grooves, such that each groove in the outer surface corresponds to a land on the inner surface and vice versa.

The profiling of the entire synchronizing ring is technologically simple, and optimal ratios between the actual friction surfaces and the grooves and recesses can be produced in a cost-efficient manner.

This method makes possible a profiling already in the flat state, depending on the friction coefficient of the material and a coating, before as well as after the profiling, or also only then when the synchronizing ring with the conical surfaces is completed. Special advantages are achieved when both conical surfaces are used as friction surfaces.

According to a feature of the invention the division of the profiling is uniform in circumferential direction between a friction surface or land and a groove with each groove on one surface corresponding to the land on the opposite surface. The division or land or groove width is approximately 1/50 of the outer diameter, the depth of the groove being between 0.4 and 0.8 mm, the outer radii between the lands and the flanks of the grooves being 0.4 to 1.0 mm and inner radii between the flanks and the floor or each groove between 0.7 and 1.2 mm.

The friction layers may be molybdenum coatings and the friction surface may be interrupted in the circumferential direction and can be sintered.

The synchronizing ring can be cut from a disk and given the conical shape, can be shaped from a pipe segment, profiled to have the alternating lands and grooves, or can be fabricated from sheet material.

In the case of two friction surfaces combined with adroit profiling and dimensioning, a considerable increase of the friction surface results, with concurrent optimization of the recesses provided for oil transport. In this way it is possible to reduce the shifting force and the thermal stress and to accelerate the shifting operation.

In combination with molybdenum size-limited coating of both friction surfaces of the, as a rule, finished synchronizing ring, it is possible to achieve a high load capacity and a long life, with relatively easy, low manufacturing.

However, sintered layers affixed before the profiling and form-stamping are also favorable in synchronization rings with one or two friction surfaces, because in these cases the production of the rings can be combined with the required uniform coating. As a starting material a disk, as well as a pipe, but also sheet material can be used in a cost-efficient manner.

BRIEF DESCRIPTION OF THE DRAWING

The above and other objects, features and advantages of my invention will become more readily apparent from the following description, reference being made to the accompanying highly diagrammatic drawing in which:

FIG. 1 is a top view of a synchronizing ring;

FIG. 2 is a sectional view of a synchronizing ring; and

FIG. 3 is a detail of FIG. 1 with profiling.

SPECIFIC DESCRIPTION

The synchronizing ring 1 according to FIGS. 1 to 3, has two mutually parallel conical surfaces 2, 3, which are interrupted by profiling (hollow stamping) of the entire synchronizing ring 1, so that recesses 5, 6 on the one side from corresponding conical surface projections 5' and 6'on the other side. The division 41 of the profile 4 which runs in the circumferential direction of the ring, should therefore be approximately 1/50 of the outer diameter 21 of the synchronizing ring 1 and approximately uniform. Depending on the construction of the clutch with either one or two friction couplings in the synchronizing assembly, one conical surface 2 or 3, but predominantly both, can be coated with a friction layer 7. The stamping depth 51, 61 of the respective recesses 5 and 6 of the finished synchronizing ring 1 has to be within the range of 0.4 to 0.8 mm, and the respective outwardly oriented radii 52, 62 formed between the projections and recesses has to range between 0.4 to 1.0 mm, and the inner radius 53, 63 of the recesses between 0.7 to 1.2 mm.

One of the conical surfaces 2, 3, or predominantly both of them can be coated with a size-limited molybdenum coating 7, which, as known, is applied to the finished ring. However, it is also possible to cover the starting material, for instance a ring cut out from a disk, with dense-sintered coating, and to proceed with the finishing—profiling and form-stamping—afterwards. The process steps required for the shaping are this way combined with uniform process steps for the dense-sintering coating. Besides using a flat ring stamped out from a plate material for the production of the synchronizing ring 1 and the subsequent profiling and shaping, it is also possible to use a cylindrical pipe as a blank. Also, the production of the synchronizing ring 1 from sheet material with an over-all width 11 is possible, whereby through crosscutting, and optionally in combination with one-sided form-cutting to the width of the friction surface 12, with subsequent finishing and welding, a corresponding blank similar to the pipe segment, but already provided with an engagement profile 8, is made available.

I claim:

1. A synchronizing ring for a synchronizing assembly in a transmission of a motor vehicle which comprises a synchronizing ring body having parallel conical inner and outer surfaces and formed along each of said surfaces with uniformly spaced apart lands separated by grooves so that the lands and the grooves along each of said surfaces are respectively of equal circumferential width, each of said surfaces having a friction coating and each groove in said outer surface being disposed in a region corresponding to a land of said inner surface and each land of said outer surface being disposed in a region of said body corresponding to a location of a respective groove of the inner surface.

2. The synchronizing ring defined in claim 1 wherein each groove has flanks forming a respective inner radius with a floor of the respective groove and a respective outer radius with an adjacent land, said uniformly spaced apart lands separated by said grooves each being approximately 1/50 of the outer diameter of the synchronizing ring, each groove having a depth of substantially 0.4 to substantially 0.8 mm, each outer radius being substantially 0.4 to 1.0 mm and each inner radius being substantially 0.7 to 1.2 mm.

3. The synchronizing ring defined in claim 2 wherein said friction coatings are molybdenum coatings.

* * * * *